US007023193B2

(12) United States Patent
Champion et al.

(10) Patent No.: US 7,023,193 B2
(45) Date of Patent: Apr. 4, 2006

(54) ELIMINATION OF POTENTIAL TRANSFORMER IN ANSI TYPE A VOLTAGE REGULATOR

(75) Inventors: Robert Champion, Lena, MS (US); Muhammad Sohail, Ridgeland, MS (US)

(73) Assignee: Siemens Power Transmission & Distribution, Inc., Wendell, NC (US)

( * ) Notice: Subject to any disclaimer, the term of this patent is extended or adjusted under 35 U.S.C. 154(b) by 1 day.

(21) Appl. No.: 10/872,732

(22) Filed: Jun. 21, 2004

(65) Prior Publication Data

US 2005/0007079 A1 Jan. 13, 2005

Related U.S. Application Data

(60) Provisional application No. 60/480,413, filed on Jun. 20, 2003.

(51) Int. Cl.
*G05B 24/02* (2006.01)
*H02J 1/00* (2006.01)

(52) U.S. Cl. ...................... 323/305; 323/341; 323/256

(58) Field of Classification Search ................ 323/305, 323/256, 341, 263, 257, 258
See application file for complete search history.

(56) References Cited

U.S. PATENT DOCUMENTS 4,307,345 A 12/1981 Schoen ...................... 324/424
4,336,490 A * 6/1982 Lewis ...................... 323/305
4,896,092 A * 1/1990 Flynn ...................... 323/258
5,550,459 A * 8/1996 Laplace ...................... 323/255
5,619,121 A * 4/1997 Trainor ...................... 323/256
5,633,580 A * 5/1997 Trainor et al. ............. 323/256

FOREIGN PATENT DOCUMENTS

WO 833255 4/1960
WO 1086147 10/1967

OTHER PUBLICATIONS

PCT International Search Report in Appl. No. PCT/US2004/019705, mailed Sep. 27, 2004.
PCT Written Opinion.

* cited by examiner

*Primary Examiner*—Bao Q. Vu

(57) ABSTRACT

An ANSI Type A voltage regulator that eliminates the need for a potential transformer is disclosed. A control unit finds an output voltage by constantly monitoring the input voltage across the utility windings and the stored tap position. The value of the output voltage is further fine tuned by taking into account the effect of the impedance of the voltage regulator itself on the output voltage. The impedance is calculated using the instantaneous current through the regulator, the maximum rated current of the voltage regulator, the instantaneous voltage through the voltage regulator, the instantaneous Power Factor, and the tap position of the voltage regulator.

27 Claims, 4 Drawing Sheets

ELIMINATION OF POTENTIAL TRANSFORMER IN ANSI TYPE A VOLTAGE REGULATOR

CROSS-REFERENCE TO RELATED APPLICATIONS

This application claims the benefit of U.S. Provisional Application Ser. No. 60/480,143, filed Jun. 20, 2003.

BACKGROUND OF THE INVENTION

The present invention relates to voltage regulators and, more particularly, to the use of the utility winding and a control unit in ANSI Type "A" Voltage Regulators to calculate the load voltage without the need of an embedded potential transformer.

A voltage regulator can be thought of as an autotransformer that regulates a secondary voltage. If there is a primary voltage that has a tendency to fluctuate, a voltage regulator will produce a constant secondary voltage. For instance, if a primary, or input, voltage fluctuates between 110 volts and 130 volts, the voltage regulator will maintain the secondary, or output, voltage at a constant 120 volts. Usually, a voltage regulator can increase or decrease its output voltage by up to 10% of its input voltage in ⅝% steps. The voltage regulator is equipped with a control unit which monitors the input and output voltages of the voltage regulator and moves the tap changer by the ⅝% steps to maintain a specified output voltage.

Typically, an ANSI load-side series winding, or Type "A," voltage regulator uses a separate potential transformer to sense the load voltage and feeds that voltage to the control unit so that the control unit can change the tap position as needed. FIG. 1 illustrates the typical physical connection of a voltage regulator 100 with an embedded potential transformer 60. The potential transformer 60 is connected between the "L" and "SL" bushings. For example, the source voltage across the S and SL bushings may fluctuate between about 6900 volts and about 8300 volts. The load voltage is then stepped down by the potential transformer 60 to approximately 120 volts (or roughly between about 110 volts to about 130 volts). The control unit (not shown) then changes the tap position in response to the stepped down source voltage which results in the output voltage across the L and SL bushings of a constant 7620 volts.

FIG. 2 illustrates a block diagram of the flow of information to the control unit in a typical embodiment of a voltage regulator that contains an embedded potential transformer. In block 130, the voltage regulator feeds the input voltage to the control panel. In addition, in step 140, the output voltage from the embedded potential transformer supplies the output voltage to the control panel. The control panel, in step 150, in turn monitors the input and output voltages and adjusts position of the tap in order to adjust the output voltage as needed.

However, a need exists to simplify a voltage regulator by eliminating some of its components. By eliminating components of the voltage regulator, the material and manufacturing costs are reduced. In addition, the reliability of ANSI Type A voltage regulator increases with the reduction of components.

BRIEF SUMMARY OF THE INVENTION

According to the present invention, the utility windings and a control unit already present in voltage regulators will be used to sense the source voltage and calculate the load voltage in the voltage regulator without the need of a potential transformer. The utility windings provide the source, or input, voltage for the control unit. The control unit constantly monitors all tap changes as well as continuously stores the tap position electronically. The output voltage is calculated by the control unit by using the input voltage across the utility windings and the tap position in memory. To calculate a more accurate output voltage, the inherent impendence of the voltage regulator itself is considered in the calculation. The impedance of the voltage regulator is calculated using the instantaneous current through the regulator, the maximum rated current of the voltage regulator, the instantaneous voltage through the voltage regulator, the instantaneous power factor, and the tap position of the voltage regulator. The control unit, then in turn, may change the position of the tap in response to the load voltage.

In accordance with one embodiment of the present invention, the control unit software will be adjusted and reprogrammed for different modes of applications.

Accordingly, it is an object of the present invention to reduce the cost of material needed as well as the cost of manufacturing for the ANSI Type "A" voltage regulators by eliminating the need for the potential transformer component. By eliminating the potential transformer, reliability of the voltage regulator will increase due to the reduction of one active component in its assembly.

Other objects of the present invention will be apparent in light of the description of the invention embodied herein.

BRIEF DESCRIPTION OF THE SEVERAL VIEWS OF THE DRAWINGS

The following detailed description of specific embodiments of the present invention can be best understood when read in conjunction with the following drawings, where like structure is indicated with like reference numerals and in which.

In the following detailed description of the preferred embodiments, reference is made to the accompanying drawing that forms a part hereof, and in which is shown by way of illustration, and not by way of limitation, a specific embodiment in which the invention may be practiced. It is to be understood that other embodiments may be utilized and that logical, mechanical and electrical changes may be made without departing from the spirit and scope of the present invention.

DETAILED DESCRIPTION

Figure 1:
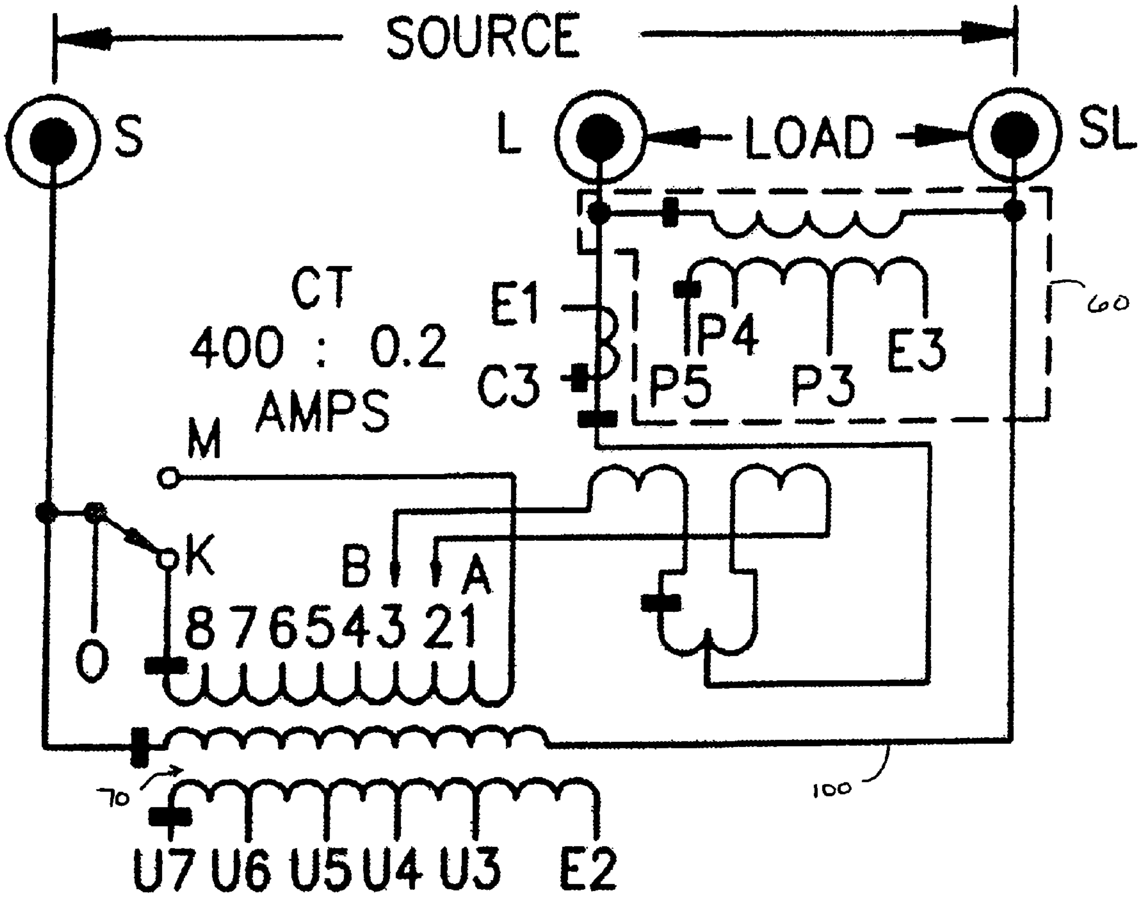
Figure 1 PRIOR ART
FIG. 1 is a schematic illustration of the typical physical layout of a voltage regulator with an embedded potential transformer.
Figure 2:
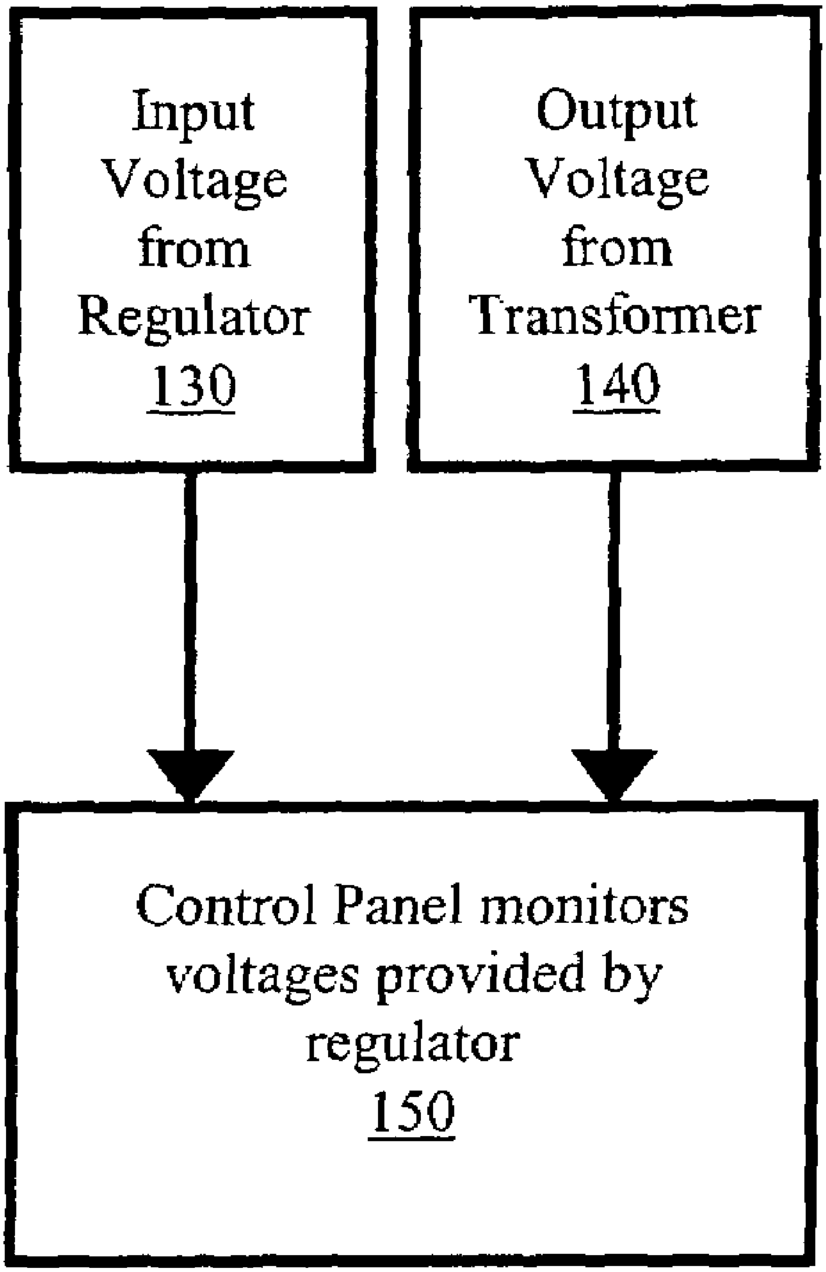
Figure 2 PRIOR ART
FIG. 2 is a block diagram of the flow of information to the control unit in a typical embodiment of a voltage regulator with an embedded potential transformer.
Figure 3:
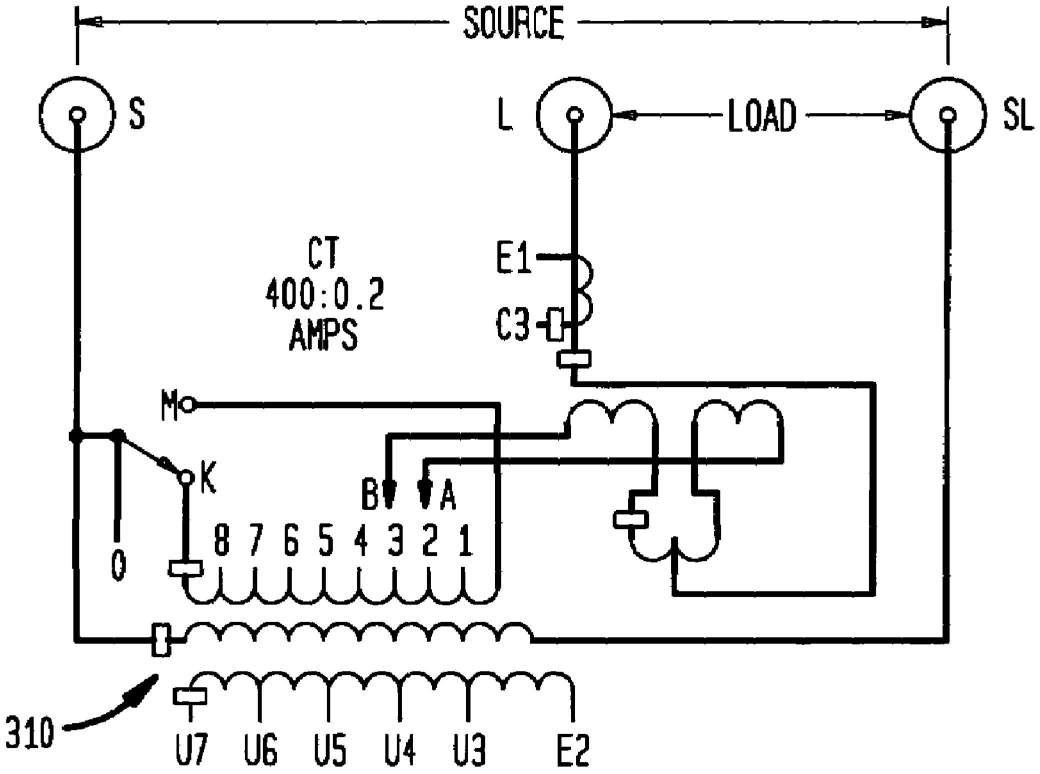
FIG. 3 is a schematic illustration of the physical layout of a voltage regulator without an embedded potential transformer according to an embodiment of the present invention.

Referring to FIG. 3, is a schematic illustration of the physical layout of an ANSI Type A voltage regulator without an potential transformer according to one embodiment of the present invention. The input, or source, voltage is measured between the S and SL bushings, or across the utility windings 310. The output, or load, voltage is calculated between the L and SL bushings. The windings and other internal components are mounted in an oil filled tank. The tap position changing mechanism is commonly sealed in the tank. The tap position changing mechanism is controlled by a control unit. In addition, the control unit keeps constant and accurate track of the current tap position.

Figure 4:
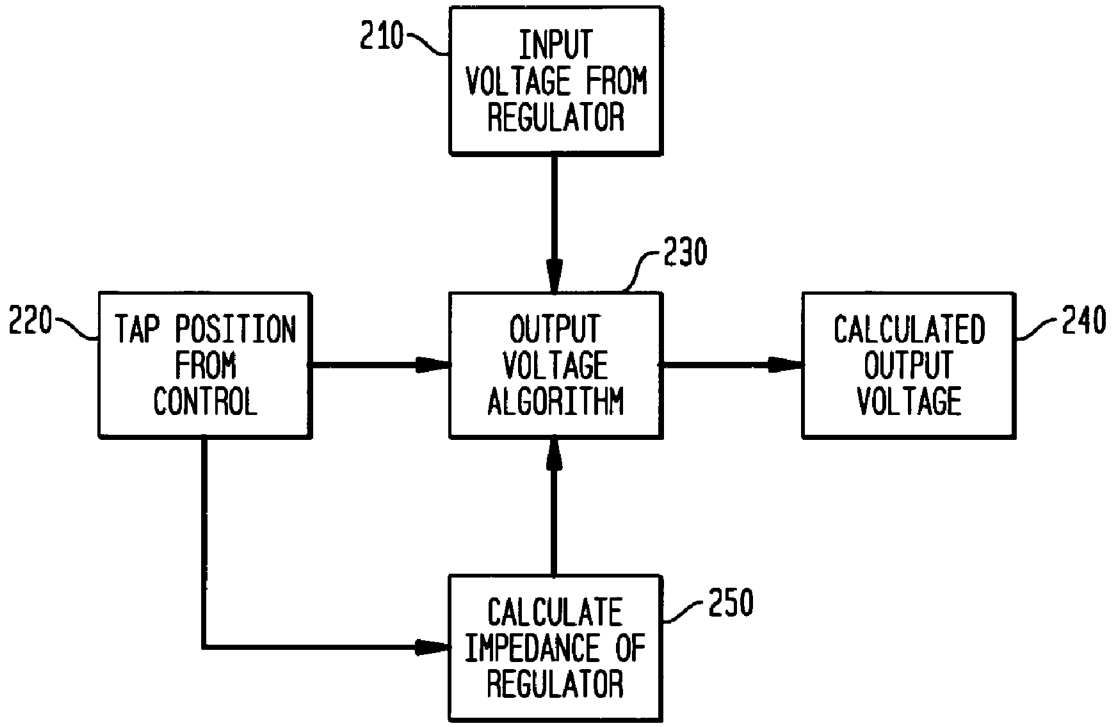
FIG. 4 is a block diagram illustrating the flow of information to and from a control unit in a voltage regulator without an embedded potential transformer according to an embodiment of the present invention.

Referring to FIG. 4, a block diagram illustrates the flow of information to and from a control unit in a voltage regulator without an embedded potential transformer according to one embodiment of the present invention. The control unit monitors the input voltage provided by the voltage regulator across the S and SL bushings, the tap position at all times, and the output voltage. The output voltage 240 is calculated from the output voltage algorithm 230 that uses the tap position supplied from the control unit 220, the input voltage across the voltage regulator utility windings 210, and from the calculated impedance of the voltage regulator itself 250. The output voltage algorithm may be stored on any computer-readable medium accessible to the control unit. The control unit will notify the tap position changing mechanism to change the tap position in response to the calculated output voltage in order to maintain a consistent output voltage across the L and SL bushings. The control unit considers each step, or each tap position, as a 5/8% difference in output.

The control unit calculates an output voltage of the voltage regulator using a two step process. First, the control unit continuously monitors the tap changes as well as constantly stores the tap position electronically. Second, the output voltage is approximated by the control unit by using the input voltage across the utility windings as well as the stored position of the tap. The output voltage value is calculated by taking the instantaneous input voltage from across the utility windings and multiplying it by one plus the physical tap position that has been multiplied by the voltage difference of one tap position (1).

$$V_{out}=V_{in}*(1+(\text{tap\_pos}*V_{diff.\ 1\ tap\ pos.})) \quad (1)$$

However, since the voltage regulator is an electrical device, it also consumes power and places load on the electrical system. Therefore, the impedance of the voltage regulator must also be considered in the calculation of the output voltage by the control unit to ensure a more accurate output voltage value. The impedance of the voltage regulator is found from using the instantaneous current through the regulator, the maximum rated current of the voltage regulator, the instantaneous voltage through the voltage regulator, the instantaneous power factor, and the tap position of the voltage regulator.

The calculated output voltage value can be summarized as equaling the output voltage value plus the voltage drop (2) due to the impedance of the voltage regulator. The voltage drop equals the instantaneous current multiplied by the impedance of the voltage regulator (3). Both the instantaneous current and the impedance are complex numbers.

$$V_{cal.\ out}=V_{out}+V_{drop} \quad (2)$$

$$V_{drop}=I*Z \quad (3)$$

The resistive component of the instantaneous current value equals the instantaneous current value multiplied by the absolute value of the instantaneous power factor (4). The instantaneous power factor is derived from fundamental voltage and current frequencies and is represented by the ratio of real power to apparent power. If the instantaneous power factor is less that zero, then the power factor is leading and reactive component of the instantaneous current equals the instantaneous current multiplied by the square root of one minus the square of the power factor (5). On the other hand, if the instantaneous power factor is greater than zero, the instantaneous power factor is lagging and the reactive component of the current equals the negative of the instantaneous current multiplied by the square root of one minus the square of the power factor (6).

$$I_{res}=I*|PF| \quad (4)$$

$$I_{react}=I*\text{sqrt}(1.0-PF^2) \quad (5)$$

$$I_{react}=-I*\text{sqrt}(1.0-PF^2) \quad (6)$$

Assuming that the impedance percentage is known at a particular tap position, for example 0.6% at tap position 16, the impedance is then calculated to be 0.6% multiple by the square of the input voltage divided by the KVA rating of the voltage regulator (7). The KVA rating on voltage regulators defines the load carrying or power capability and stands for kilovolt-amperes. Since the KVA rating equals the input voltage multiplied by the maximum rated current (8), the impedance equation reduces to 0.6% times the input voltage divided by the maximum rated current (9) or 0.6% of the input voltage across that utility windings divided by maximum rated current (10). Therefore, to find the impedance at any tap position, the impedance becomes 0.6% multiplied by the instantaneous input voltage across the utility windings divided by the maximum rated current multiplied by the tap position squared divided by sixteen squared (11).

$$Z=(0.006*V^2)/KVA \quad (7)$$

$$KVA=V*I_{max} \quad (8)$$

$$Z=(0.006*V)/I_{max} \quad (9)$$

$$Z=(0.006*V_{in})/I_{max} \quad (10)$$

$$Z=(((0.006*V_{in})/I_{max})*\text{tap\_pos}^2)/16^2 \quad (11)$$

Since the impedance is complex and mostly reactive, the resistive component of the impedance can be considered to equal one quarter the reactive impedance. Therefore, the reactive component of the impedance equals the calculated impedance or four times the resistive component of the impedance (12). Finally, the voltage drop is calculated to equal the resistive component of the impedance multiplied by the resistive component of the current minus the reactive component of the impedance multiplied by the reactive component of the current (13). The control unit can then use this value to determine accurately the output voltage in equation (2) and to notify the tap position changing mechanism when it is appropriate to change the position of the tap.

$$Z_{react}=4*Z_{res} \quad (12)$$

$$V_{drop}=(Z_{res}*I_{res})-(Z_{react}*I_{react}) \quad (13)$$

It is noted that terms like "preferably," "commonly," and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

The invention claimed is:

1. A voltage regulator for regulating an output voltage in response to an input voltage and a calculated output voltage, the voltage regulator comprising:

at least three external bushings for accessing electrical signals and for reading the values of said input and output voltages of said voltage regulator;

a control unit for constant monitoring of input voltage, tap position and output voltage, for continuously storing said tap position electronically, and for calculating an output voltage, and fine tuning said calculated output voltage;

internal utility windings for providing said input voltage and to power said control unit; and a tap changing mechanism for manipulating said tap position in response to commands received from said control unit.

2. The voltage regulator of claim 1 wherein said calculation of output voltage is calculated using said stored tap position and the input voltage across said utility windings.

3. The voltage regulator of claim 1 wherein said calculation of output voltage is calculated by said control unit.

4. The voltage regulator of claim 3 wherein said calculation of output voltage is calculated by multiplying the input voltage across said utility windings by one plus the tap position multiplied by the voltage difference of one step.

5. The voltage regulator of claim 4 wherein each said step is a ⅝% difference in output voltage.

6. The voltage regulator of claim 4 wherein said fine tuning calculated said output voltage equals said output voltage plus voltage drop, wherein said voltage drop is the product of the instantaneous current through said voltage regulator and the impedance of said voltage regulator.

7. The voltage regulator of claim 6 wherein fine tuning calculated said output voltage equals the product of resistive component of said impedance of said voltage regulator and resistive component of said instantaneous current through said voltage regulator minus the product of reactive component of said impedance of said voltage regulator and reactive component of said instantaneous current through said voltage regulator.

8. The voltage regulator of claim 6, wherein said instantaneous current and said impedance are complex numbers.

9. The voltage regulator of claim 8, wherein said impedance is mostly reactive.

10. The voltage regulator of claim 8, wherein resistive component of instantaneous current equals the value of said instantaneous current multiplied by the absolute value of the instantaneous power factor of said voltage regulator.

11. The voltage regulator of claim 10, wherein said instantaneous power factor is represented by the ratio of real power to apparent power of said voltage regulator.

12. The voltage regulator of claim 10, wherein said instantaneous power factor is leading if said instantaneous power factor is less than zero.

13. The voltage regulator of claim 12, wherein if said instantaneous power factor is leading, the reactive component of said instantaneous current equals said instantaneous current multiplied by the square root of one minus the square of said instantaneous power factor.

14. The voltage regulator of claim 10, wherein said instantaneous power factor is lagging if said instantaneous power factor is greater than zero.

15. The voltage regulator of claim 14, wherein if said instantaneous power factor is lagging, the reactive component of said instantaneous current equals the negative of said instantaneous current multiplied by the square root of one minus the square of said instantaneous power factor.

16. The voltage regulator of claim 1 wherein said fine tuning calculating said output voltage is calculated using the tap position, the voltage across said utility windings, and the impedance of said voltage regulator.

17. The voltage regulator of claim 16, wherein said impedance of said voltage regulator is calculated using instantaneous current through said voltage regulator, maximum rated current of said voltage regulator, instantaneous voltage through said voltage regulator, instantaneous power factor and said tap position of said voltage regulator.

18. The voltage regulator of claim 17, wherein resistive component of said impedance of said voltage regulator equals 0.25 multiplied by input voltage across said utility windings divided by said maximum rated current of said voltage regulator multiplied by a known percentage of impedance at a known tap position multiplied by the square of said tap position whose product is divided by the square of said known tap position.

19. The voltage regulator of claim 17, wherein reactive component of said impedance of said voltage regulator equals four times said resistive component of said impedance of said voltage regulator.

20. The voltage regulator of claim 1 wherein said control unit notifies said tap changing mechanism to change tap position in response to said calculation of output voltage.

21. A method of calculating an output voltage in a voltage regulator, the method comprising:

determining the input voltage across internal utility windings of said voltage regulator;

monitoring constantly said input voltage, tap position and output voltage by a control unit;

storing continuously said tap position electronically by said control unit;

calculating an output voltage using said tap position and said input voltage by said control unit;

refining said calculated output voltage by said control unit by factoring in the effects of the impedance inherent to said voltage regulator; and changing position of said tap in response to said refine calculated output voltage determined by said control unit.

22. The method of calculating the output voltage of claim 21, wherein calculating an output voltage is calculated by multiplying said input voltage by one plus the tap position multiplied by the voltage difference of one tap position.

23. The method of calculating the output voltage of claim 21, wherein refining said calculated output voltage involves adding the voltage drop from said output voltage, wherein said voltage drop is the product of the instantaneous current through said voltage regulator and the impedance of said voltage regulator.

24. The method of calculating the output voltage of claim 23, further comprising:

calculating said voltage drop, wherein real component of said voltage drop equals the product of resistive component of said impedance of said voltage regulator and resistive component of said instantaneous current through said voltage regulator minus the product of reactive component of said impedance of said voltage regulator and reactive component of said instantaneous current through said voltage regulator.

25. The method of calculating the output voltage of claim 21, further comprising:

calculating said impedance of said voltage regulator, wherein said impedance is a complex number and the reactive component of said impedance of said voltage regulator equals four times the resistive component of said impedance of said voltage regulator.

26. The method of calculating the output voltage of claim 25, wherein resistive component of said impedance of said voltage regulator equals 0.25 multiplied by said input voltage divided by said maximum rated current of said voltage regulator multiplied by a known percentage of impedance at a known tap position multiplied by the square of said tap position whose product is divided by the square of said known tap position.

27. A computer-readable medium having stored thereon computer-executable instructions for calculating an output voltage in a voltage regulator, the computer-executable instructions when executed by a processor, cause the processor to perform a method comprising the steps of:

determining the input voltage across internal utility windings of said voltage regulator;

monitoring constantly said input voltage, tap position and output voltage by a control unit;

storing continuously said tap position electronically by said control unit;

calculating an output voltage using said tap position and said input voltage by said control unit;

refining said calculated output voltage by said control unit by factoring in the effects of the impedance inherent to said voltage regulator; and changing position of said tap in response to said refine calculated output voltage determined by said control unit.

* * * * *